United States Patent [19]

Fremd

[11] Patent Number: 4,656,876
[45] Date of Patent: Apr. 14, 1987

[54] APPARATUS FOR MEASURING THE MASS OF A MOTOR VEHICLE

[75] Inventor: Rainer Fremd, Stuttgart, Fed. Rep. of Germany

[73] Assignee: Daimler-Benz Aktiengesellschaft, Stuttgart, Fed. Rep. of Germany

[21] Appl. No.: 874,857

[22] Filed: Jun. 16, 1986

Related U.S. Application Data

[63] Continuation of Ser. No. 763,367, Aug. 7, 1985, abandoned.

[30] Foreign Application Priority Data

Aug. 8, 1984 [DE] Fed. Rep. of Germany ....... 3429184

[51] Int. Cl.$^4$ .................. G01D 21/00; G01G 19/03; G01G 9/00; G01M 17/00
[52] U.S. Cl. ...................................... 73/865; 364/424; 364/556; 364/567
[58] Field of Search ............... 73/116, 865, 865.9, 73/865.8, 432.1; 177/25; 364/424, 426, 431.07, 556, 565, 566, 567, 568

[56] References Cited

U.S. PATENT DOCUMENTS

| | | | |
|---|---|---|---|
| 3,572,098 | 3/1971 | Fogwell | 73/580 |
| 4,165,975 | 8/1979 | Kwiatowski et al. | 364/567 X |
| 4,539,650 | 9/1985 | Griffin et al. | 364/567 |
| 4,548,079 | 10/1985 | Klatt | 364/426 X |

FOREIGN PATENT DOCUMENTS 3246201  6/1984  Fed. Rep. of Germany ........ 73/865

Primary Examiner—Stewart J. Levy
Assistant Examiner—Tom Noland

[57] ABSTRACT

The mass of a vehicle is determined by recognizing that the natural oscillations in the transmission line of a motor vehicle and the mass of the motor vehicle are in a one-to-one relationship if the instantaneous transmission ratio remains unchanged. To determine the natural oscillations, i.e., the rate of fluctuations, a computer records engine speed signals of a speed transducer and calculates therefrom the actual vehicle mass, taking into account the instantaneous transmission ratio, which can be determined for example by comparing the engine speed to the vehicle speed or sensing the engaged gear of the gear box.

15 Claims, 7 Drawing Figures

4,656,876

APPARATUS FOR MEASURING THE MASS OF A MOTOR VEHICLE

This is a continuation of application Ser. No. 763,367, filed Aug. 7, 1985 and now abandoned.

BACKGROUND AND SUMMARY OF THE INVENTION

The invention relates to an apparatus for measuring the mass of a motor vehicle.

In order to determine the most favorable shift points for an automatic gearbox of a motor vehicle or to give the driver of a vehicle with manually shifted gear box optimum shift recommendations by means of an appropriate display device, the particular total mass of the vehicle must be known. However, with commercial vehicles in particular, the mass may vary in a wide range. It must be taken into account here that a trailer or semitrailer may also be included, the mass of which cannot be ignored. A loaded heavy truck train can, for example, be approximately five times heavier than the empty traction vehicle. In the Federal Republic of Germany for example, the total weights of typical heavy duty vehicles or trains lie between about 8 tons and about 38 tons.

In view of the wide range of possible vehicle weights, it is not possible to work with fixed given values for the mass of the vehicle in determining the shift points or shift recommendations.

Up until now, no suitable methods for determining the mass have yet been proposed.

The basically conceivable method of attaching dynamometers to the axles for example has the disadvantage that on truck trains dynamometers and wiring are also necessary on the trailer. An extremely high level of expenditure on technical equipment with correspondingly high costs would therefore have to be accepted. The same applies to position transducers with which the vehicle mass is determined via the jounce of the individual axles.

A less expensive method consists in detecting the acceleration and deceleration behavior of the vehicle in successive vehicle states with different drive torques and calculating the mass in a microcomputer using the equations of motion. The mass of a trailer which may be included is recorded here automatically. In this process, the accelerations acting on the vehicle may be determined, inter alia, from changes in the engine speed or wheel speed. The acting engine torque is, for example, taken from tables, which are electronically stored, as a function of engine speed and control rod displacement of the injection pump. A problem here is that inaccuracies must be expected due to individual variations and parameter changes, such as air pressure, temperature, etc.

Therefore, it is the object of the invention to create an apparatus which permits the mass of a vehicle or of a vehicle train to be determined at high accuracy within a large measuring range with little structural expenditure.

This object is achieved by measuring the speed of the engine and the instantaneous transmission ratio of the transmission line of the vehicle and using a computer, to store a series of consecutive engine speed values, calculate the period or frequency of periodic speed fluctuations using the stored engine speed values and generating a measured value signal for the mass of the vehicle as a function of the frequency of periodic speed fluctuations and of the transmission ratio.

Apart from the computer, which can if necessary also be used for other control functions within the vehicle, only sensors for the speed of the engine and the particular transmission ratio are required. According to a preferred embodiment, a speed transducer for the gearbox input speed and a vehicle velocity transducer (speedometer) or a transducer for the gearbox output speed are used. The transmission ratio can be readily calculated from the vehicle velocity and engine speed or from gearbox input and output speeds.

Instead of the vehicle velocity transducer, a transducer for the gear, engaged at the time, of the vehicle gearbox—for example switches cooperating with the shift lever or adjusting members of the gearbox—may be used.

As the oscillations in the transmission line occur more intensely with load changes, a particularly preferred embodiment of the invention provides for transducers reacting to load changes to be arranged and connected to an input of the computer, the computer executing a determination of the mass only after a load change. Such transducers may, for example, react to the actuation of the clutch, in particular to the clutch engagement, to movements of the accelerator linkage of the engine, for example adjusting rods of the injection pump, or else to gear changes of the gearbox.

Further objects, features, and advantages of the present invention will become more apparent from the following description when taken with the accompanying drawings which show, for purposes of illustration only, several embodiments in accordance with the present invention.

DETAILED DESCRIPTION OF THE DRAWINGS

Figure 1:
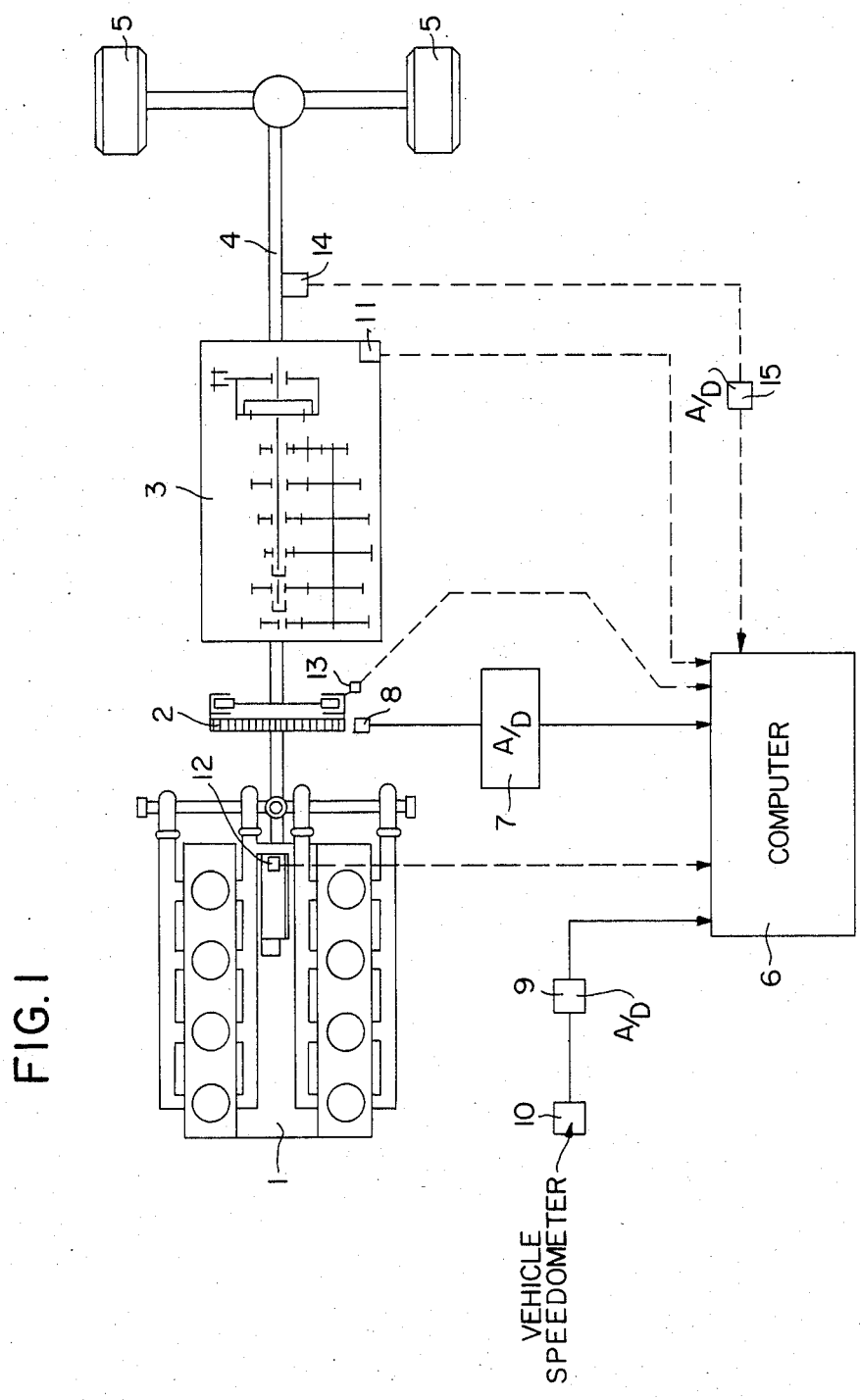
FIG. 1 shows a diagrammatic view of the transmission line and of the apparatus for measuring the vehicle mass.

FIG. 1 shows in a diagrammatic plan view an engine 1, a clutch 2, via which the engine 1 is connected to a multi-stage, manually shifted gearbox 3, and a cardan shaft 4, connecting on the output side to the gearbox 3 and transmission-coupled to the drive wheels 5 of the vehicle in a known way.

A computer 6 is connected on the input side, directly or via a signal converter 7, to a speed sensor 8 such that the computer in each case receives a signal representing the speed of the engine 1. The computer 6 has an adequate memory capacity to store the measured values for the speed of the engine 1 coming from the speed sensor 8 or the analog/digital converter 7 as a series of measurements over a prolonged period.

Furthermore, the computer 6 is connected on the input side, directly or via another signal converter 9, to a speedometer 10, so that the computer 6 receives signals for the vehicle velocity.

Instead, the computer 6 may be connected on the input side, again directly or via another signal converter 15, to a transducer 14 for the gearbox output speed.

From the measured values for the vehicle velocity or the gearbox output speed and the measured values for the engine speed, the computer 6 can determine indirectly the engaged gear of the gearbox 3 or its transmission ratio. With conventional gearboxes, the transmission ratio remains constant in the particular gear so that, when the clutch 2 is engaged, in each case predetermined, gear-dependent ratios (quotients) between engine speed and velocity have to ensue.

The present invention is the recognition of the direct relationship of the mass of the vehicle and the natural frequency of the speed oscillation in the transmission line expressed as $$m = K_1(K_2\omega_0^2 - K_3)^{-1} + K_4 \quad (I)$$

wherein m is the mass, $\omega_0$ the natural angular frequency of the speed variation and $K_1$ to $K_4$ are constants which are a function of the vehicle and can be given.

The invention is based on the knowledge that the following relationship exists between the mass m and the natural frequency $\omega_0$ of the speed variations of a vehicle:

$$m = \frac{1}{r^2} \cdot \left( \frac{i_G^2 i_H^2 c J_M}{i_G^2 J_M \omega_0^2 - c} - J_K i_H^2 - J_R \right) \quad (II)$$

where
m is the vehicle mass,
$\omega_0$ is the natural angular frequency of the oscillation in the transmission line,
r is the dynamic tire rolling radius,
$i_G$ is the gearbox transmission,
$i_H$ is the axle transmission,
c is the rigidity of the transmission line,
$J_M$ is the mass moment of inertia of engine and clutch and gearbox,
$J_K$ is the mass moment of inertia of the cardan shaft and
$J_R$ is the mass moment of inertia of the wheels and of the stub shafts.

The particular advantage of the invention lies on the one hand in the accuracy and on the other hand in the comparatively low expenditure on instrumentation.

The natural frequencies of the oscillations in the transmission line which are induced during travel are not dependent on tractive resistances. It is therefore basically irrelevant whether the vehicle is travelling on a flat section or a decline or an incline. Thus results with good reproducibility are achieved.

Figure 2:
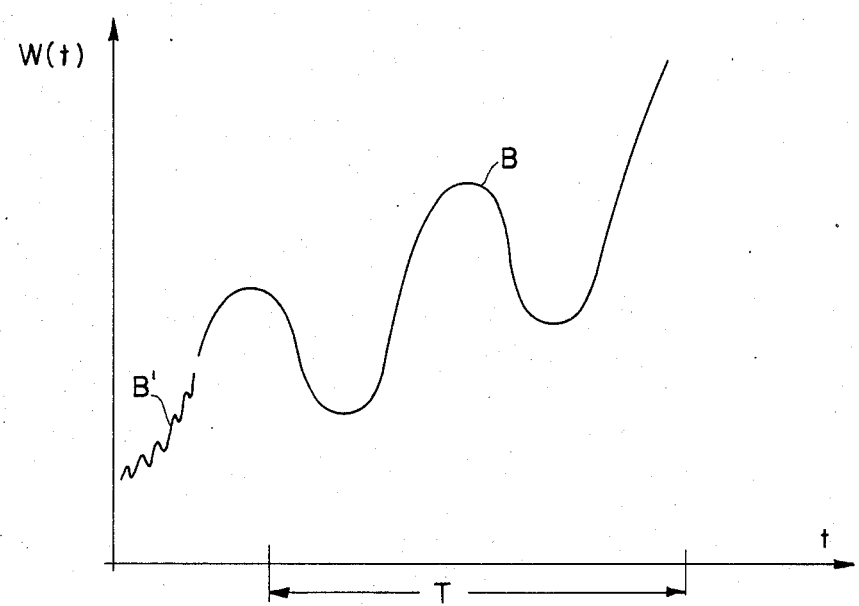
FIGS. 2 to 5 show diagrams for explaining the measuring method executed, aided by computer.

For determination of the vehicle mass or for determination of the natural frequency of the speed oscillations in the transmission line, the computer 6 is used preferably to execute the measuring method described below:

The speed sensor 8 generates a signal which represents the instantaneous speed of the engine 1. This is shown by way of example in FIG. 2, in which $\omega$ is plotted as a function of time t. Here FIG. 2 shows the speed ratios during an acceleration phase. On average, the speed increases. Superimposed on the speed increase are speed fluctuations, the frequency of which corresponds to the oscillations in the transmission line from motor 1 to wheels 5. For simplification of the illustrations, the speed fluctuations with the natural frequency of the oscillations in the transmission line are shown. Only at section B' of curve B, which represents the function of the speed $\omega$ on time t, diagrammatically shows higher-frequency harmonic oscillations as well.

If the vehicle is braked, with an average falling speeds $\omega$, an in principle identical curve is produced, the frequency (and thus the period) of the natural oscillation shown remains unchanged. The same applies in a stationary travelling state with constant velocity. The natural angular frequency $\omega_0$ and thus the period of the oscillations in the transmission line remain unchanged with changes in travelling states. The natural angular frequency $\omega_0$ and the period are only influenced by changes in the transmission ratio of the transmission line. However, this can be taken in the account by the computer 6 in the data processing explained further below by the computer 6 determining the particular transmission ratio or receiving corresponding input signals.

In order to determine the mass m of the vehicle according to the equations I or II given at the start, in principle only the period or the frequency of the oscillation has to be determined. The period and frequency $\omega_0$ are completely independent of the oscillation amplitude.

Figure 3:
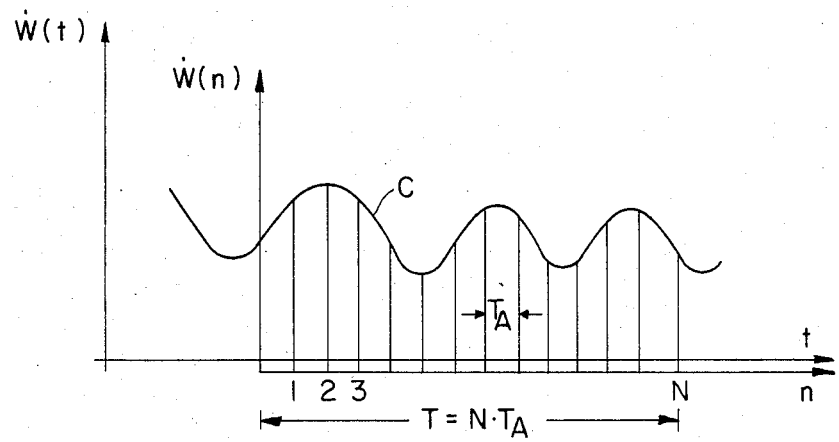

In order to avoid errors in the determination of the period or frequency due to speed increase or speed drop in acceleration or deceleration phases, a transfer is made, as in FIG. 3, to time derivation $\dot{\omega}$ of the speed $\omega$. The curve C of the time derivation of speeds shows an oscillation of the same frequency and period as the curve B of speeds in FIG. 2. However, the ordinates of the curve C, i.e., the values of the time derivation $\dot{\omega}$, have an approximately constant value on a time average.

For determination of the mass m of the vehicle during a time span T, which corresponds at least to twice the period of the oscillations of curves B and C, the computer 6 receives signals representing the instantaneous speed, from which the computer 6 then determines N discrete numerical values $\dot{\omega}(n)$ of the time derivation of speed $\omega$, which consequently have a time difference $T_a = T/N$ from one another.

The values $\dot{\omega}(n)$ with $1 \leq n \leq N$, likewise shown in FIG. 3, are stored in the computer for further processing.

From the stored values $\dot{\omega}(1)$ to $\dot{\omega}(N)$, the computer 6 then determines an autocorrelation function corresponding to:

$$R(k) = \frac{1}{N-k} \sum_{n=1}^{N-k} \dot{\omega}(n) \dot{\omega}(n+k) \quad (III)$$

where k is successively made equal to all integral values between $k_1$ and $k_2$. The values R(k) of the autocorrelation function are shown graphically in FIG. 4 as a function of k. With correct specification of the values $k_1$ and $k_2$, there is in the interval with the limits $k_1$ and $k_2$ precisely a maximum of the values R(k) or of the corresponding curve D, the natural angular frequency $\omega_0$ according to $$\omega_0 = 2\pi/KT_A \quad (IV)$$

depending on the ordinate K of the maximum value R(K) of the autocorrelation function.

Figure 4:
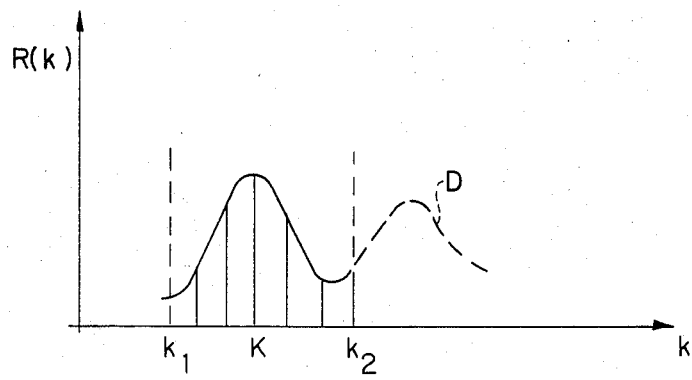

As the possible values of the natural angular frequency $\omega_0$ of the oscillations in the transmission line can be calculated in advance from the equations I and II given above, consequently the values $k_1$ and $k_2$ can likewise be given in advance as fixed values such that the sought maximum value R(K) according to FIG. 4 is always precisely in the interval between $k_1$ and $k_2$. Thus, secondary maxima of the curve D cannot lead to incorrect determinations of the natural angular frequency $\omega_0$ of the oscillations in the transmission line.

As the computer 6 only calculates discrete values of the autocorrelation function R(k), the abscissa K of the maximum calculated value R(K) does not have to coincide precisely with the abscissa K* of the maximum of curve D. To make it possible to determine the abscissa K* more exactly, the computer can, if necessary, execute an interpolation process, for example by carrying out the so-called method of least error squares. In this process, the calculated value pairs k,R(k) around the value pair K,R(K) serve as given values for an interpolation parabola E, which is shown diagrammatically in FIG. 5. The abscissa of the maximum of the interpolation parabola E coincides extremely precisely with the sought value K*.

In case where the computer 6 operates at high clock frequency, an interpolation process is generally superfluous because in such a case the number N has a large value and consequently the difference $k_2-k_1$ is likewise large. This is synonymous to calculating many values R(k) in the interval between $k_1$ and $k_2$ in FIG. 4 which are spaced at a correspondingly small difference in the direction of abscissa k.

As the speed fluctuations according to load changes are particularly pronounced, it is expedient to position appropriate transducers which pass on a signal to the computer 6 when there are load changes. In this case, the computer can be programmed such that the determination of the vehicle mass is only carried out after a load change.

An example of the type of transducer which may be provided is a switch arrangement 11 which reacts to shift operations of the gearbox 3 as illustrated in FIG. 1. If the switch arrangement emits different signals depending on the engaged gear, the computer 6 instantaneously receives information on the particular gearbox transmission. Thus the signal path from the speedometer 10 to the computer 6 may be dispensed with as the velocity signal is not required in this case for determination of the gearbox transmission—at least with the conventional gearboxes which have a fixed given transmission ratio after engaging the gear.

If necessary, a sensor 12 may also be arranged on the accelerator linkage of the engine and reacts to adjustments of this linkage.

Instead, also possible is the arrangement of a transducer 13 which reacts to the actuation of the clutch 2 and supplies a signal to the computer 6 when the clutch is engaged.

Figure 6:
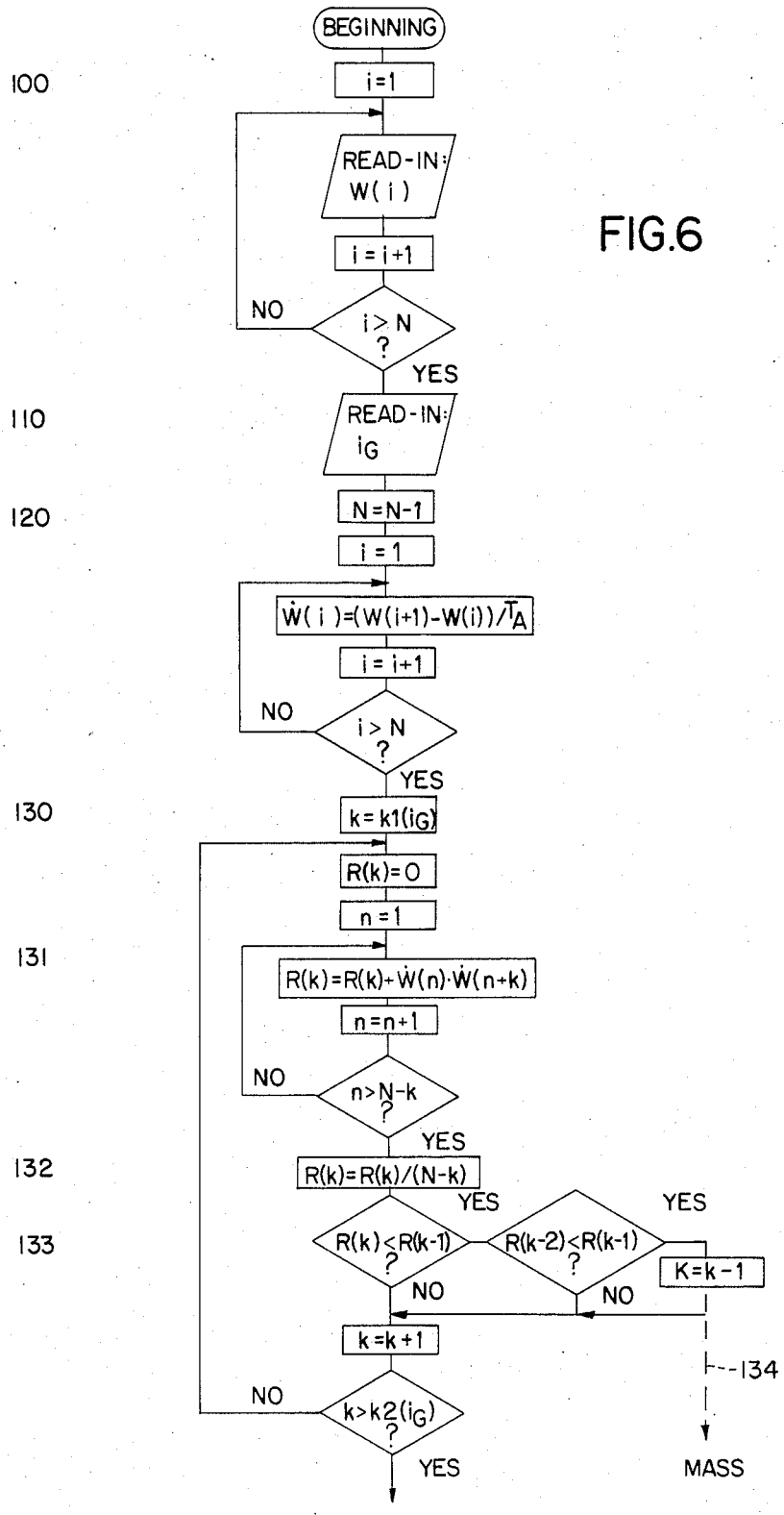
FIGS. 6 and 7 show data flowcharts for explaining the data processing executed by the computer.

The data processing to be carried out by the computer 6 will now be explained with reference to FIGS. 6 and 7.

First of all, a series of measurements for the speeds $\omega$ is read into the memory of the computer 6. This operation begins in the data flowchart of FIG. 6 at position 100, by the respective measured values of the speeds $\omega(i)$ being read in successively in consecutive clock cycles, which are denoted here by the index i.

This reading in operation is concluded when the clock index i reaches a number N.

Then, as in section 110 of the data flowchart, the gearbox transmission $i_G$ is read in, which is for example passed directly to the computer 6 by means of the switch arrangement 11 in FIG. 1. If necessary, the gearbox transmission can also be determined indirectly from the engine speed, the velocity or else in another way, as specified further above.

Then, corresponding to section 120 of the data flowchart, time derivations $\dot{\omega}(i)$ are calculated by the difference quotients $\omega(i+1)-\omega(i)/T_A$ being formed in each case, $T_A$ in turn corresponding to the time difference between consecutive speed values. After completion of section 120, there are thus a total of N consecutive values for the time derivation $\dot{\omega}$ of the speed in the memory of the computer 6, N being decremented by 1 in section 120 compared with N in section 100, as is indicated by $N=N-1$ at the beginning of section 120.

Then section 130 is carried out, which is for determination of the values R(k) of the autocorrelation function. For this calculation, k is first made equal to $k=k_1(i_G)$, i.e., first of all (cf. FIG. 4) $R(k_1)$ is determined, namely with a value dependent on the particular sought gearbox transmission $i_G$.

The values R(k) are input in each case into a separate memory cell, which is set to zero before this input, as is indicated by R(k)=0.

The determination of each value R(k) is then performed as in section 131 by first forming the product $\dot{\omega}(1)\cdot\dot{\omega}(1+k)$. Thereafter, the product $\dot{\omega}(2)\cdot\dot{\omega}(2+k)$ is formed and added to the previously mentioned product. Then formation of the product $\dot{\omega}(3)\cdot\dot{\omega}(3+k)$ is performed, which is added to the previously formed sum of the two first products, and so on until finally all products $\dot{\omega}(n)\cdot\dot{\omega}(n+k)$ for $1\leq n\leq N-k$ are formed and added together. Thereafter, at 132, the value of the sum formed is also divided by $(N-k)$ so that then a value R(k) equivalent to equation III is produced.

In a corresponding way, if necessary, the value $R(k+1)$ is then determined, and so on.

The section 130 is concluded at the latest when $k=k_2(i_G)$, i.e., when, as in FIG. 4, the value $R(k_2)$ for a value of $k_2$ dependent on the particular gearbox transmission $i_G$ has been determined.

By means of a subsection 133 of the program carried out by the computer, the abscissa K of the maximum value R(K) of the autocorrelation function R(k) can be established. An inquiry is namely made whether a value R(k) is smaller than the preceding value R(k−1) and, furthermore, whether this preceding value R(k−1) is greater than the value before that R(k−2). If both these conditions exist, k−1 is the abscissa of the maximum value of the values R(k), i.e., K=k−1.

Figure 7:
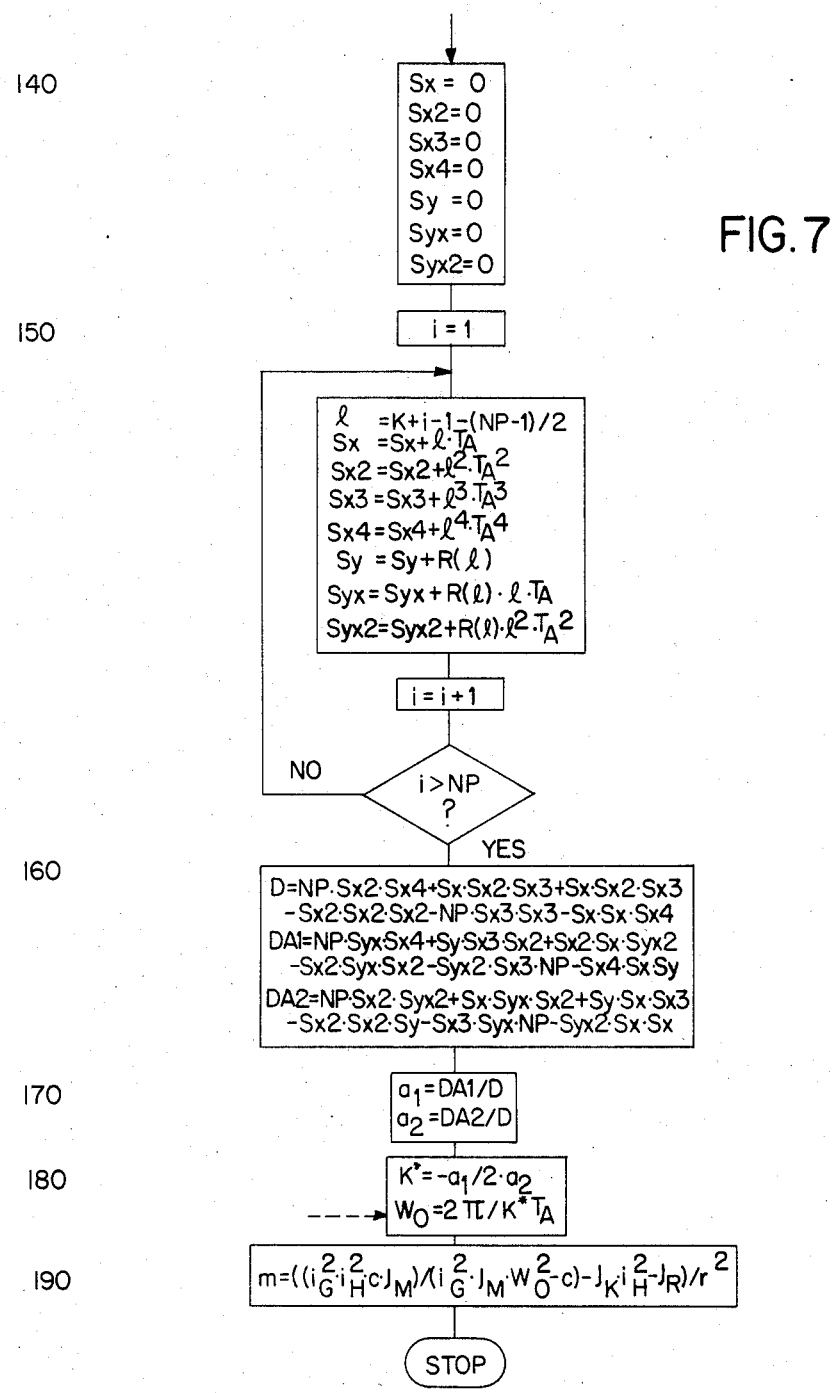

Thus, if necessary, as in position 134 of the data flowchart, the vehicle mass can be determined directly by the equations IV and II (or I) being calculated successively, i.e., by transferring in the data flowchart of FIG. 7 directly to the point denoted by the dashed arrow under position 180 and, instead of the value K* specified there, using the previously determined value K.

Figure 5:
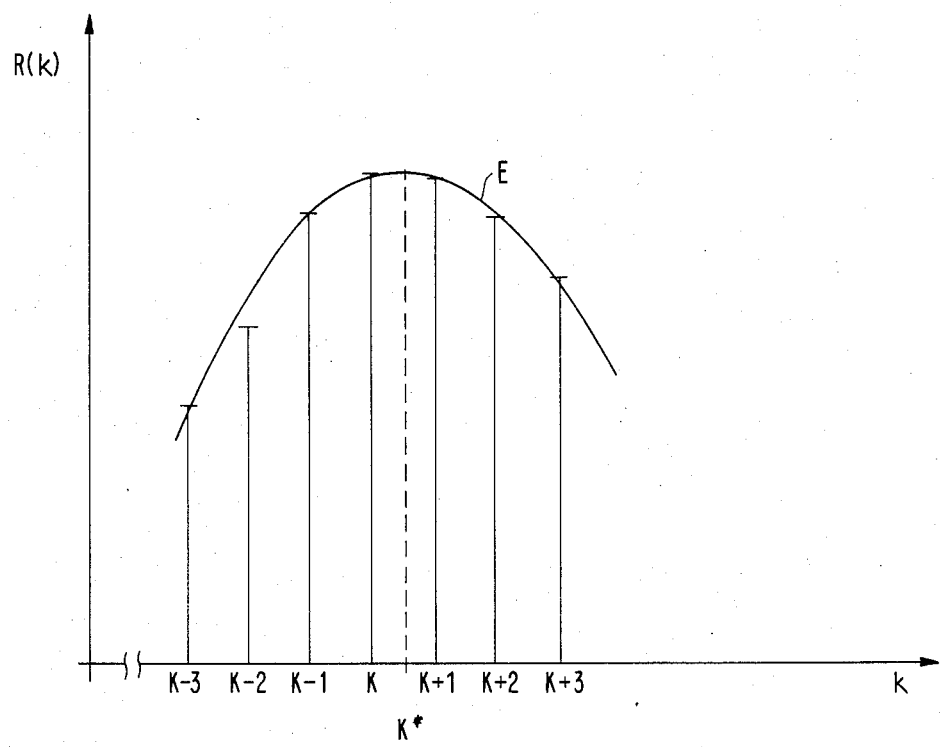

If, however, the interpolation method illustrated with reference to FIG. 5 is to be carried out, in order to determine a value K* improved over K for the position of the maximum, the program illustrated in FIG. 7 is also executed.

First of all, at 140, memory cells Sx to Syx2, required for this program section are set to zero.

Thereafter, the values Sx to Syx2 to be calculated for the particular memory cells are determined simultaneously or successively.

In this case, the value Sx is the sum of all products $lT_A$, whereby l is a whole number for which the following is true:

$$l = K + i - 1 - (NP-1)/2$$

where NP denotes the number of given values, i.e., the number of values R(k) which are used as in FIG. 5 for formation of the regression parabola E. In NP=7, as in the example of FIG. 5, l successively assumes the values K−3 to K+3 if i runs from 1 to NP.

In a corresponding way, Sx2 is calculated by the products $l^2 T_A^2$ for consecutive values of l being added. In the same way, for Sx3 and Sx4 the products $l^3 T_A^3$ and $l^4 T_A^4$ are added. The value of Sy is determined by addition of the values R(l) for consecutive l. Syx and Syx2 are the sums of the products $R(l) \cdot l T_A$ and $R(l) \cdot l^2 T_A^2$, respectively, with consecutive values of l.

Then, by executing the so-called Kramer rule, the determinants D and DA1 and DA2 are determined from the values Sx to Syx2, as specified under 160.

Thereafter, as in position 170, the vaues $a_1$ and $a_2$ can be determined which represent the coefficients of a parabola equation $$y = \text{const.} + a_1 x + a_2 x^2$$

whereby y represents the ordinates and x the abscissae of a parabola coinciding with the curve E in FIG. 5. Then K* will be determined as $$K^* = -a_1/2a_2,$$

cf. position 180 in FIG. 7. From this, the natural frequency $\omega_0$ can be determined as $$\omega_0 = 2\pi / K^* TA.$$

Subsequently, the mass m can be determined, corresponding to position 190 in FIG. 7, according to the equation II specified above.

What is claimed is:

1. An apparatus for measuring the mass of a motor vehicle during operation comprising:
   first means for measuring the speed of an engine of said motor vehicle;
   second means for measuring the transmission ratio of the transmission of said motor vehicle; and
   third computer means connected to said first and second means for storing a series of measured engine speed values, for calculating the frequency of periodic speed fluctuations using said stored engine speed values and for calculating the mass of said motor vehicle using said frequency of periodic speed fluctuations and corresponding by measured transmission ratio.

2. Apparatus according to claim 1, wherein said second means include means for measuring the speed of said vehicle and said computer means calculates said transmission ratio from said measured engine and vehicle speed.

3. Apparatus according to claim 1, wherein said second means includes fourth means for detecting which gear of a gear box of said transmission is engaged.

4. Apparatus according to claim 3 wherein said fourth means includes means for sensing the position of a shift lever of said gear box.

5. Apparatus according to claim 1 including fifth means for determining a load change in said transmission and said computer means is connected to said fifth means and calculates said mass only in response to said detected load change.

6. Apparatus according to claim 5, wherein said fifth means includes means for sensing the movement of an accelerator linkage of said engine.

7. Apparatus according to claim 5, wherein said fifth means includes means for detecting status of a clutch in said transmission.

8. A method of measuring the mass of a motor vehicle during operation comprising:
   measuring the speed of an engine of said motor vehicle;
   storing a series of measured engine speed values;
   calculating the frequency of periodic speed fluctuations using said stored engine speed values;
   measuring the transmission ratio of the transmission of said motor vehicle; and
   calculating the mass of said motor vehicle using said frequency of periodic speed fluctuations and correspondingly measured transmission ratio.

9. A method according to claim 8 including measuring the speed of said motor vehicle and calculating said transmission ratio from said measured motor vehicle speed and measured engine speed.

10. A method according to claim 8, wherein measuring the transmission ratio includes sensing which gear of a gear box of said transmission is engaged.

11. A method according to claim 10, wherein sensing said engaged gear includes sensing the position of a shift lever of said gear box.

12. A method according to claim 8, including detecting a load change in said transmission and calculating said mass only in response to said detected load change.

13. A method according to claim 12, wherein detecting load change includes sensing movement of an accelerator linkage of said engine.

14. A method according to claim 12, wherein detecting load change includes detecting status of a clutch in said transmission.

15. A method according to claim 8, wherein calculating said frequency of periodic speed fluctuations includes taking the time derivative of the stored engine speed values.

* * * * *